United States Patent
Amaya et al.

(10) Patent No.: US 9,908,319 B2
(45) Date of Patent: Mar. 6, 2018

(54) THREE-DIMENSIONAL SHAPING METHOD

(71) Applicant: Matsuura Machinery Corporation, Fukui City, Fukui (JP)

(72) Inventors: Kouichi Amaya, Fukui (JP); Kousuke Ishimoto, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 15/386,559

(22) Filed: Dec. 21, 2016

(65) Prior Publication Data
US 2017/0274597 A1 Sep. 28, 2017

(30) Foreign Application Priority Data

Mar. 24, 2016 (JP) .................................. 2016-059848

(51) Int. Cl.
| | | |
|---|---|---|
| *B29C 41/22* | (2006.01) | |
| *B33Y 10/00* | (2015.01) | |
| *B33Y 50/02* | (2015.01) | |
| *B29C 64/386* | (2017.01) | |
| *B29C 67/00* | (2017.01) | |
| B22F 3/105 | (2006.01) | |
| B29C 64/153 | (2017.01) | |
| B29K 105/00 | (2006.01) | |

(52) U.S. Cl.
CPC ............. *B33Y 10/00* (2014.12); *B29C 64/386* (2017.08); *B29C 67/0077* (2013.01); *B29C 67/0088* (2013.01); *B33Y 50/02* (2014.12); B22F 3/1055 (2013.01); B29C 64/153 (2017.08); B29K 2105/251 (2013.01)

(58) Field of Classification Search
CPC .................................. B29C 67/77; B33Y 40/00
USPC ....................... 425/356, 358, 135, 145, 174.4
See application file for complete search history.

(56) References Cited

U.S. PATENT DOCUMENTS

| | | | | |
|---|---|---|---|---|
| 4,247,508 A | * | 1/1981 | Housholder | ........ B29C 67/0077 264/122 |
| 2005/0142024 A1 | * | 6/2005 | Herzog | ............... B29C 67/0077 264/460 |

(Continued)

FOREIGN PATENT DOCUMENTS

| | | |
|---|---|---|
| JP | 9-286058 A | 11/1997 |
| JP | 2006-513055 A | 4/2006 |

(Continued)

*Primary Examiner* — Joseph S Del Sole
*Assistant Examiner* — Thukhanh T Nguyen
(74) *Attorney, Agent, or Firm* — Richard M. Goldberg (57) ABSTRACT

A three-dimensional shaping method includes a step of forming a powder layer and a step of sintering the powder layer by a moving laser beam or electron beam are alternately repeated to perform a multilayer operation within a container, a plurality of equal-width divided regions are set in a multilayer region along a height direction, and then the number of multilayers N in each of equal-width divided regions which can reflect the degree of variations, according to the degree of variations in the shape of the cross section of a boundary on the upper side and the shape of the cross section of a boundary on the lower side in each of the equal-width divided regions, and the thickness of each multilayer unit in each equal-width divided region is selected, and the coordinates of an outer periphery in each of the cross sections of the number N are set.

21 Claims, 10 Drawing Sheets

(56) References Cited

U.S. PATENT DOCUMENTS

| | | | |
|---|---|---|---|
| 2010/0233012 A1* | 9/2010 | Higashi | B22F 3/1055 |
| | | | 419/9 |
| 2013/0186549 A1* | 7/2013 | Comb | B29C 65/02 |
| | | | 425/90 |
| 2016/0282848 A1* | 9/2016 | Hellestam | B29C 67/0077 |

FOREIGN PATENT DOCUMENTS

| | | |
|---|---|---|
| JP | 2008-006827 A | 1/2008 |
| JP | 2013-67036 A | 4/2013 |
| JP | 2015-112752 A | 6/2015 |

\* cited by examiner

THREE-DIMENSIONAL SHAPING METHOD

TECHNICAL FIELD

The present invention relates to a method of manufacturing a three-dimensional shaped article in which when a step of forming a powder layer and a sintering step using a laser beam or an electron beam on the powder layer are repeated, the thickness of each multilayer unit can be selected.

BACKGROUND ART

In a three-dimensional shaping method, the thickness of each multilayer unit is constant in most cases.

In actuality, in Patent Document 1, although consideration is given to the optimization of the thickness of the outermost surface layer in three-dimensional shaping, the thickness is not changed for each multilayer unit.

However, Patent Document 2 discloses that, when in a multilayer operation in a predetermined stage, a convex portion exceeding the thickness of multilayers is detected, the thickness of multilayers in the subsequent stage is set to exceed the height of the convex portion.

However, in the setting of the thickness as described above, the thickness is not selected based on unified criteria corresponding to the overall shape of a shaped object.

In actual three-dimensional shaping, a variation in the cross-sectional shape of a shaped object in a horizontal direction, that is, a direction perpendicular to a height direction in which a multilayer operation is performed and the thickness of each multilayer unit are closely connected with each other.

Specifically, when the shape of each multilayer cross section is significantly varied along the height direction, the thickness of each multilayer unit is decreased such that the original shape of the shaped object can be accurately realized whereas when only a slight variation in the thickness along the up/down direction is produced, even if the thickness of each multilayer unit is set larger, the original shape of the shaped object does not necessarily become inaccurate.

However, in a conventional technique, no consideration is given to the appropriate setting of the thickness of each multilayer unit according to the variation conditions of the cross section in the horizontal direction along the up/down direction.

PRIOR ART DOCUMENTS

Patent Documents

Patent Document 1: Japanese Published Unexamined Patent Application No. 2013-67036
Patent Document 2: Japanese Published Unexamined Patent Application No. 2015-112752

SUMMARY OF INVENTION

Technical Problem

An object of the present invention is to provide, in a three-dimensional shaping method, a configuration in which the thickness of each multilayer unit is appropriately set according to the degree of variation in the cross section of a shaped object in a horizontal direction along a height direction.

Solution to Problem

In order to achieve the above object, the basic configurations of the present invention are as follows.

(1) A three-dimensional shaping method in which a step of forming a powder layer and a step of sintering the powder layer by application of a moving laser beam or a moving electron beam are alternately repeated to perform a multilayer operation within a container, where a plurality of equal-width divided regions are set in a multilayer region to along a height direction, and then according to following processes, a number of multilayers N in each of the equal-width divided regions is selected, for selecting a thickness of each multilayer unit in each of the equal-width divided regions:

1. a process for calculating, in respective cross sections forming boundaries of both upper and lower sides in the equal-width divided regions of a model which is to be shaped, a center position of each of the cross sections and an average distance from the center position to an outer periphery with a CAM or a computer controller and calculating, for each of the equal-width divided regions, an absolute value d of a difference between an average distance of the respective cross sections in the boundary on the upper side and an average distance of the respective cross sections in the boundary on the lower side;

2. a process for, when it is assumed that d is 0, setting a minimum number of multilayers $N_1$, detecting a maximum value D of d and setting a maximum number of multilayers $N_2$ in the equal-width divided region where the maximum value D is formed;

3. a process for setting an increasing number n as d increases between the minimum value $N_1$ and the maximum value $N_2$, and selecting a number of multilayers N when N=[n], where [n] is a Gauss symbol indicating a unit of an integer;

4. a process for setting, when in each of the equal-width divided regions in the above 1, equal-width division is further performed with the number of multilayers N in the above 3 along an up/down direction, coordinates of the outer periphery corresponding to the model in the above 1 in each of cross sections of the number N; and 5. a process for controlling, in actual shaping, forming and sintering of the powder layer based on the number of multilayers N selected in the above 3 in each of the equal-width divided regions and movement of a cutting tool in which a position of the coordinates of the outer periphery set in the above 4 is a final cutting position.

(2) A three-dimensional shaping method in which a step of forming a powder layer and a step of sintering the powder layer by application of a moving laser beam or a moving electron beam are alternately repeated to perform a multilayer operation within a container, where a plurality of equal-width divided regions are set in a multilayer region along a height direction, and then according to following processes, a number of multilayers N in each of the equal-width divided regions is selected, for selecting a thickness of each multilayer unit in each of the equal-width divided regions:

1. a process with adopting Cartesian coordinates, that is, (x, y) coordinates and then calculating, in respective cross sections forming boundaries of both upper and lower sides in the equal-width divided regions of a model which is to be shaped, a sum of maximum widths of the respective cross sections in a lateral direction and maximum widths thereof in a vertical direction with a CAM or a computer controller and calculating, for each of the equal-width divided regions, an absolute value d of a difference between a sum of the respective cross sections in the boundary on the upper side and a sum of the respective cross sections in the boundary on the lower side;

2. a process for, when it is assumed that d is 0, setting a minimum number of multilayers $N_1$, detecting a maximum value D of d and setting a maximum number of multilayers $N_2$ in the equal-width divided region where the maximum value D is formed;

3. a process for setting an increasing number n as d increases between the minimum value $N_1$ and the maximum value $N_2$, and selecting a number of multilayers N when N=[n], where [n] is a Gauss symbol indicating a unit of an integer;

4. a process for setting, when in each of the equal-width divided regions in the above 1, equal-width division is further performed with the number of multilayers N in the above 3 along an up/down direction, coordinates of the outer periphery corresponding to the model in the above 1 in each of cross sections of the number N; and     5. a process for controlling, in actual shaping, forming and sintering of the powder layer based on the number of multilayers N selected in the above 3 in each of the equal-width divided regions and movement of a cutting tool in which a position of the coordinates of the outer periphery set in the above 4 is a final cutting position.

(3) A three-dimensional shaping method in which a step of forming a powder layer and a step of sintering the powder layer by application of a moving laser beam or a moving electron beam are alternately repeated to perform a multi-layer operation within a container, where a plurality of equal-width divided regions are set in a multilayer region along a height direction, and then according to following processes, a number of multilayers N in each of the equal-width divided regions is selected, for selecting a thickness of each multilayer unit in each of the equal-width divided regions:

1. a process with adopting rotational coordinates, that is, (r, θ) coordinates and then calculating, in respective cross sections forming boundaries of both upper and lower sides in the equal-width divided regions of a model which is to be shaped, a center position of each of the cross sections and a maximum distance from the center position to an outer periphery with a CAM or a computer controller and     calculating, for each of the equal-width divided regions, an absolute value d of a difference between a maximum distance of the respective cross sections in the boundary on the upper side and a maximum distance of the respective cross sections in the boundary on the lower side;

2. a process for, when it is assumed that d is 0, setting a minimum number of multilayers $N_1$, detecting a maximum value D of d and setting a maximum number of multilayers $N_2$ in the equal-width divided region where the maximum value D is formed;

3. a process for setting an increasing number n as d increases between the minimum value $N_1$ and the maximum value $N_2$, and selecting a number of multilayers N when N=[n], where [n] is a Gauss symbol indicating a unit of an integer;

4. a process for setting, when in each of the equal-width divided regions in the above 1, equal-width division is further performed with the number of multilayers N in the above 3 along an up/down direction, coordinates of the outer periphery corresponding to the model in the above 1 in each of cross sections of the number N; and     5. a process for controlling, in actual shaping, forming and sintering of the powder layer based on the number of multilayers N selected in the above 3 in each of the equal-width divided regions and movement of a cutting tool in which a position of the coordinates of the outer periphery set in the above 4 is a final cutting position.

Advantageous Effects of Invention

In the present invention based on the basic configurations (1), (2) and (3), the number of multilayers (N) in each of the equal-width divided regions is set according to a variation in the cross-sectional shape of each of the equal-width divided regions in the boundary in the horizontal direction, that is, the variation in the average distance from the center in the case of the basic configuration (1), the variation in the sum of the maximum widths in the lateral direction and the vertical direction in the Cartesian coordinates in the case of the basic configuration (2) and the variation in the maximum distance from the center position in the rotational coordinates in the case of the basic configuration (3), and the coordinates of the periphery of each of the cross sections based on the appropriate thickness and the number of multilayers (N) are set according to a variation in the surface in each multilayer unit in the horizontal direction, with the result that it is possible to realize the accurate shape of the shaped object.

DESCRIPTION OF EMBODIMENTS

Figure 4:
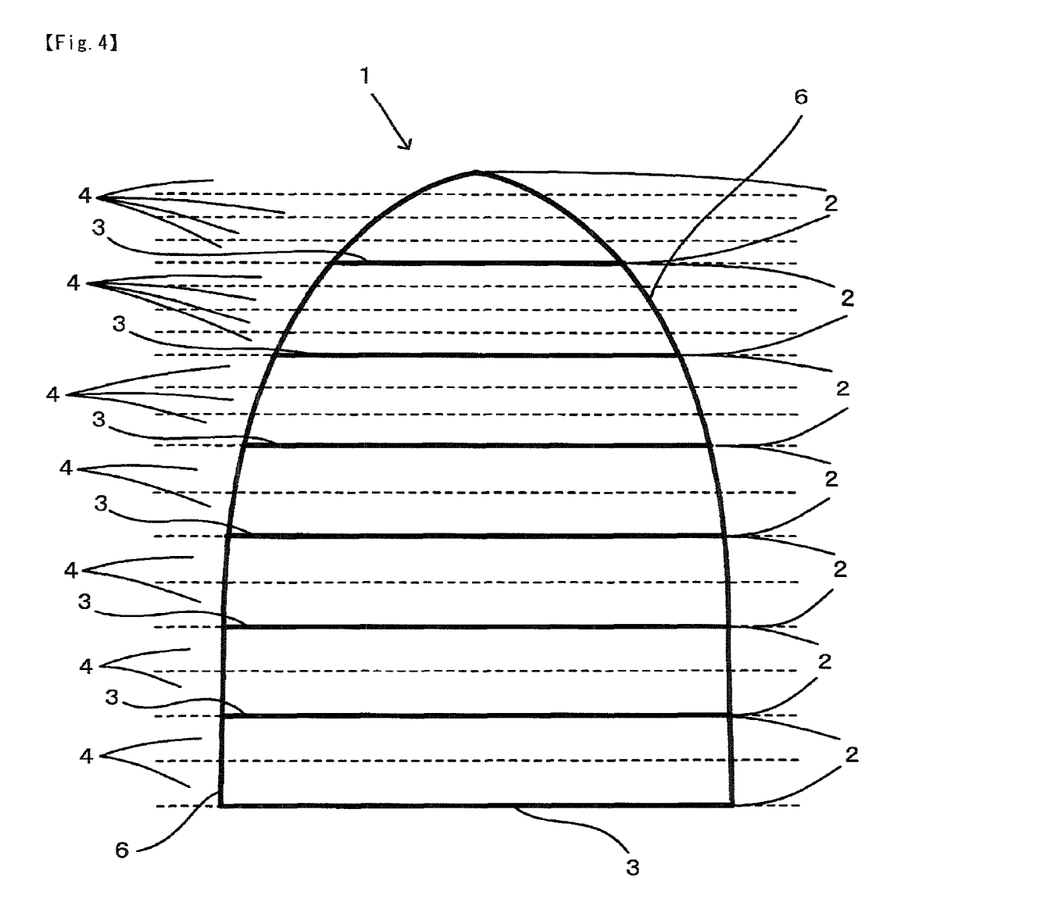
FIG. 4 is a cross-sectional view showing a state where, in a model which is to be shaped, the equal-width divided regions are set.

As shown in FIG. 4, the basic configurations (1), (2) and (3) are common in that a plurality of equal-width divided regions 2 are set in the multilayer region 4 along the height region of the shaping.

By the setting of the equal-width divided regions 2 described above, it is possible to select the number of multilayers N in each of the regions and hence select the thickness of the multilayer unit in each of the equal-width divided regions 2.

On both the upper and lower sides of each of the equal-width divided regions 2, the boundaries are always present, however, in each of the equal-width divided regions 2, as a larger variation is produced between the shape of the cross section 3 of the boundary on the upper side and the shape of the cross section 3 of the boundary on the lower side, a large state of variation conditions is produced in the outer periphery 6 along the length direction.

Attention is focused on such a state, and in the basic configurations (1), (2) and (3), the number of multilayers N is selected according to the variation conditions described above.

Specifically, in the case of the basic configuration (1), as described in the process 1, the average distance of the cross section 3 is selected as a parameter, in the case of the basic configuration (2), the sum of the maximum width of the cross section 3 in the lateral direction and the maximum width thereof in the vertical direction is selected as a parameter and in the case of the basic configuration (3), the maximum distance from the center position 5 is selected as a parameter.

These parameters are selected based on the fact that, in each of the equal-width divided regions 2, a larger difference of the each parameters is produced between the cross section 3 on the upper side and the cross section 3 on the lower side, a larger variation condition is produced among respective parameters in the multilayer cross sections 3 along the height direction.

Figure 1A:
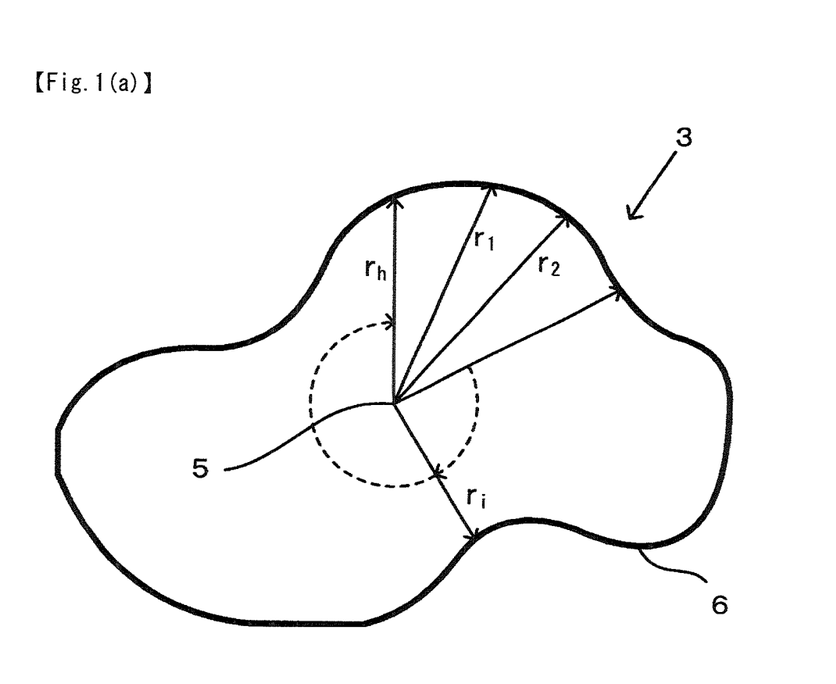
FIG. 1(a) is a cross-sectional view, when in a basic configuration (1), a center position and an average distance from the center position to an outer periphery and the absolute value d of a difference between the average distance in the cross sections of the boundaries on the upper side and the average distance in the cross sections of the boundaries on the lower side are calculated, in the boundary of each of equal-width divided regions which is a target of the calculation.
Figure 1B:
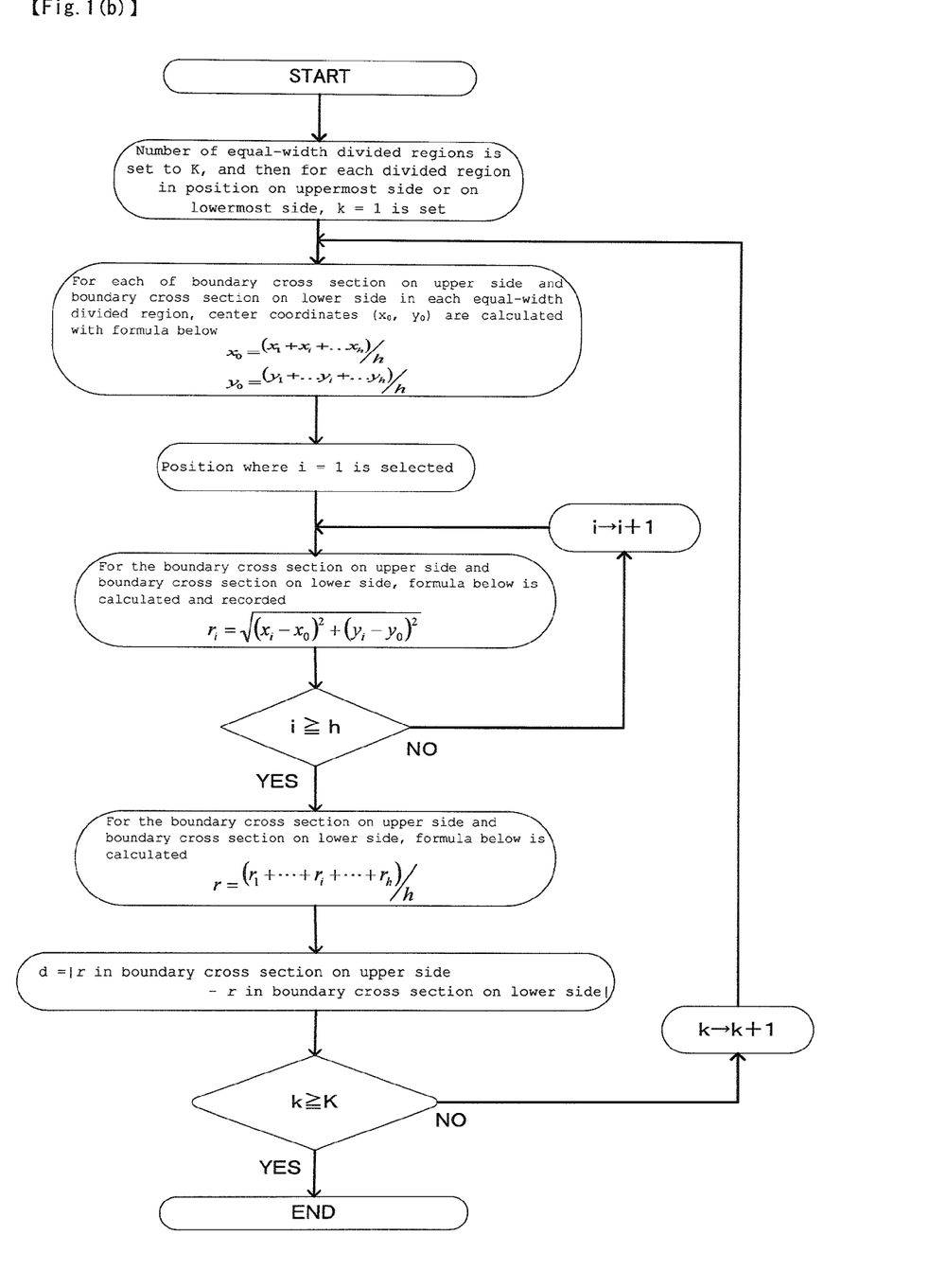
FIG. 1(b) is a flow chart showing, when in the basic configuration (1), the center position and the average distance from the center position to the outer periphery and the absolute value d of a difference between the average distance in the cross sections of the boundaries on the upper side and the average distance in the cross sections of the boundaries on the lower side are calculated, the order of the calculation.
Figure 2A:
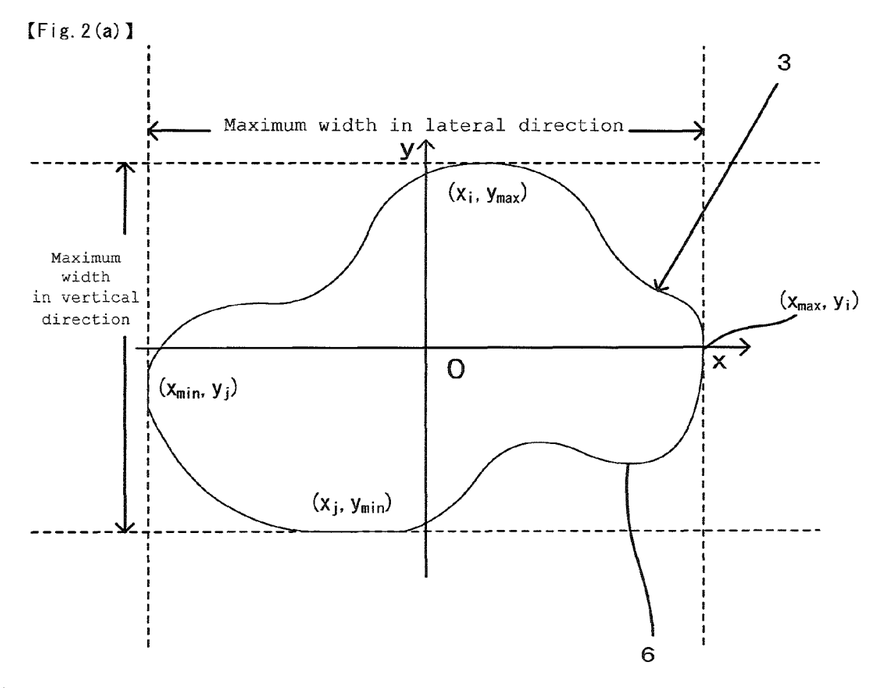
FIG. 2(a) is a cross-sectional view, when in a basic configuration (2), a sum of the maximum width in a lateral direction and the maximum width in a vertical direction and the absolute value d of a difference between the sum in the cross sections of the boundaries on the upper side and the sum in the cross sections of the boundaries on the lower side are calculated, in the boundary of each of equal-width divided regions which is a target of the calculation.
Figure 2B:
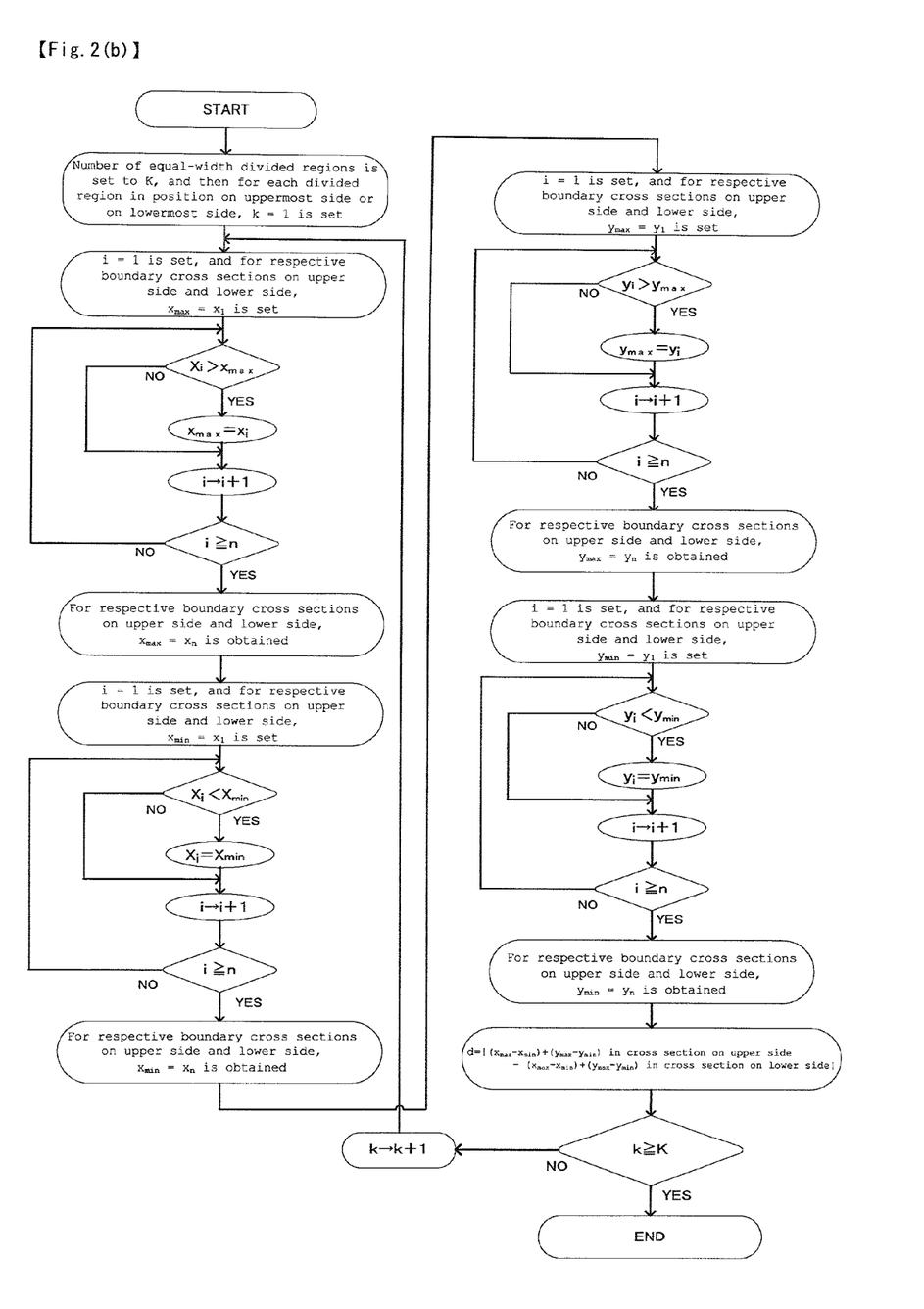
FIG. 2(b) is a flow chart showing, when in a basic configuration (2), the sum of the maximum width in the lateral direction and the maximum width in the vertical direction and the absolute value d of a difference between the sum in the cross sections of the boundaries on the upper side and the sum in the cross sections of the boundaries on the lower side are calculated, the order of the calculation.
Figure 3A:
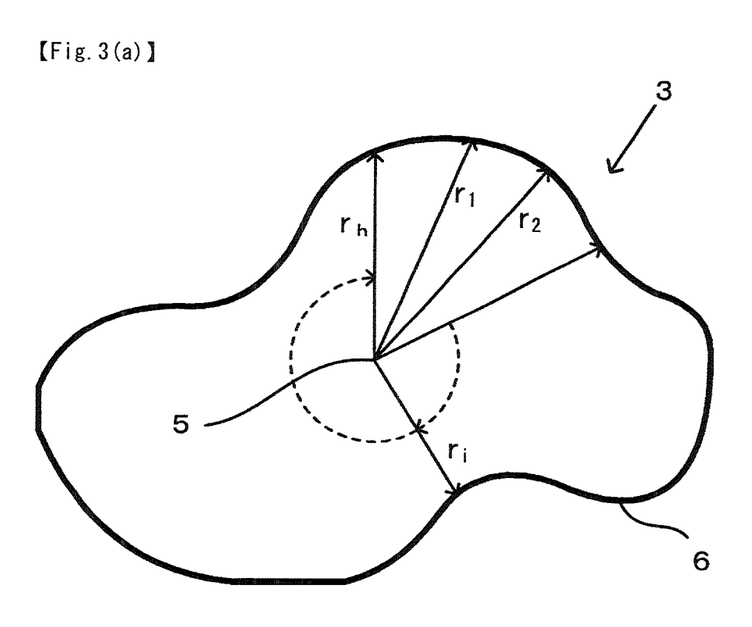
FIG. 3(a) is a cross-sectional view, when in a basic configuration (3), a center position and the maximum distance from the center position and the absolute value d of a difference between the maximum distance in the cross sections of the boundaries on the upper side and the maximum distance in the cross sections of the boundaries on the lower side are calculated, in the boundary of each of equal-width divided regions which is a target of the calculation.
Figure 3B:
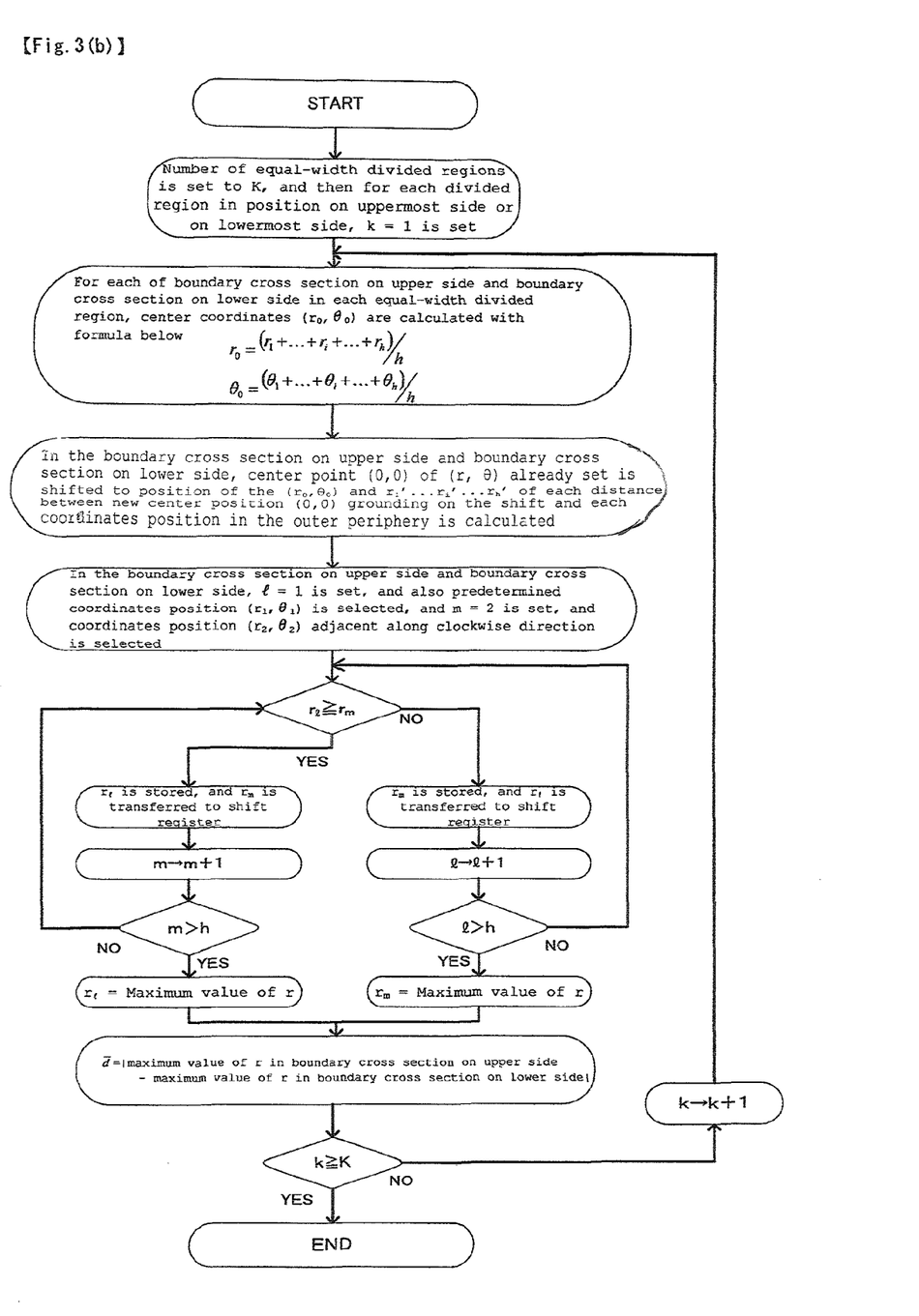
FIG. 3(b) is a flow chart showing, when in a basic configuration (3), a center position and the maximum distance from the center position and the absolute value d of a difference between the maximum distance in the cross sections of the boundaries on the upper side and the maximum distance in the cross sections of the boundaries on the lower side are calculated, the order of the calculation.

Consequently, in the basic configuration (1), as the process 1, in the respective cross sections 3 forming the boundaries of both the upper and lower sides in the equal-width divided regions 2 of a model which is to be shaped, with a CAM or a computer controller, as shown in FIGS. 1(a) and 1(b), the center position 5 of each of the cross sections 3 and the average distance from the center position 5 to the outer periphery 6 are calculated, and for each of the equal-width divided regions 2, the absolute value d of a difference between the average distance of the respective cross sections 3 in the boundary on the upper side and the average distance of the respective cross sections 3 in the boundary on the lower side is calculated, and in the basic configuration (2), the Cartesian coordinates, that is, the (x, y) coordinates are adopted, and then in the respective cross sections 3 forming boundaries of both the upper and lower sides in the equal-width divided regions 2 of a model which is to be shaped, with a CAM or a computer controller, as shown in FIGS. 2(a) and 2(b), the sum of the maximum widths of the respective cross sections 3 in the lateral direction and the maximum widths thereof in the vertical direction are calculated and, for each of the equal-width divided regions 2, the absolute value d of a difference between the sum of the respective cross sections 3 in the boundary on the upper side and the sum of the respective cross sections 3 in the boundary on the lower side is calculated, and then in the basic configuration (3), the rotational coordinates, that is, the (r, θ) coordinates are adopted, and then in the respective cross sections 3 forming the boundaries of both the upper and lower sides in the equal-width divided regions 2 of a model which is to be shaped, with a CAM or a computer controller, as shown in FIGS. 3(a) and 3 (b), the center position 5 of each of the cross sections 3 and the maximum distance from the center position 5 to the outer periphery 6 are calculated and, for each of the equal-width divided regions 2, the absolute value d of a difference between the maximum distance of the respective cross sections 3 in the boundary on the upper side and the maximum distance of the respective cross sections 3 in the boundary on the lower side is calculated.

Although the calculations of the parameters in the respective cross section 3 are realized with a CAM or a computer controller, when as in the basic configuration (1), the average distance from the center position 5 is selected as the parameter, the parameter can reflect the shape of the cross section 3 extremely accurately, whereas when as in the basic configuration (2), the maximum width in the lateral direction and the maximum width in the vertical direction are selected as the parameters and when as in the basic configuration (3), the maximum distance from the center position 5 is selected as the parameter, it is impossible to deny the fact that the basic configurations (2) and (3) are inferior to the basic configuration (1) in the accurate reflection of the shape of the cross section 3.

However, in order to calculate the average distance from the center position 5, it is necessary to calculate the center position 5 on all the point coordinates formed on the outer periphery 6 based on a digital design in the respective cross sections 3 and then to further calculate the distance from the center position 5, whereas since in a normal three-dimensional shaping method, the Cartesian coordinates, that is, the (x, y) coordinates are adopted, it is inevitably necessary to calculate the average distance based on the Pythagorean theorem.

Even if the rotational coordinates, that is, the (r, θ) coordinates are adopted, and thus it is not necessary to perform the above calculation using the Pythagorean theorem, it is very complicated to calculate the average distance.

Hence, as compared with a case where the actual shaping is immediately realized, the process 1 in the basic configuration (1) is suitable for a case where the shaping is previously realized according to the model of each shaped object 1.

By contrast, since it does not take much time to calculate the sum in the basic configuration (2) and to calculate the maximum distance in the basic configuration (3), in the actual shaping, the calculation of d can be immediately realized according to each shaped object.

The calculations of the process 1 of the basic configurations (1), (2) and (3) are as shown in the flow charts of FIGS. 1, 2 and 3, respectively.

In the flow chart of FIG. 3(b), a size relationship between $r_l$ and $r_m$ is based on a criterion in which the cross section in the boundary on the upper side is common to the cross section in the boundary on the lower side, and this is because it is naturally assumed that the number h of coordinates in the cross section in the boundary on the upper side and the cross section in the boundary on the lower side in each of the equal-width divided regions is set such that the division which is so fine as not to reverse the size relationship between $r_l$ and $r_m$ in the cross section in the boundary on the upper side and the cross section in the boundary on the lower side can be performed.

After each process 1 is performed, the processes 2, 3 and 4 of each of the basic configurations (1), (2) and (3) are identical one another.

Figure 5:
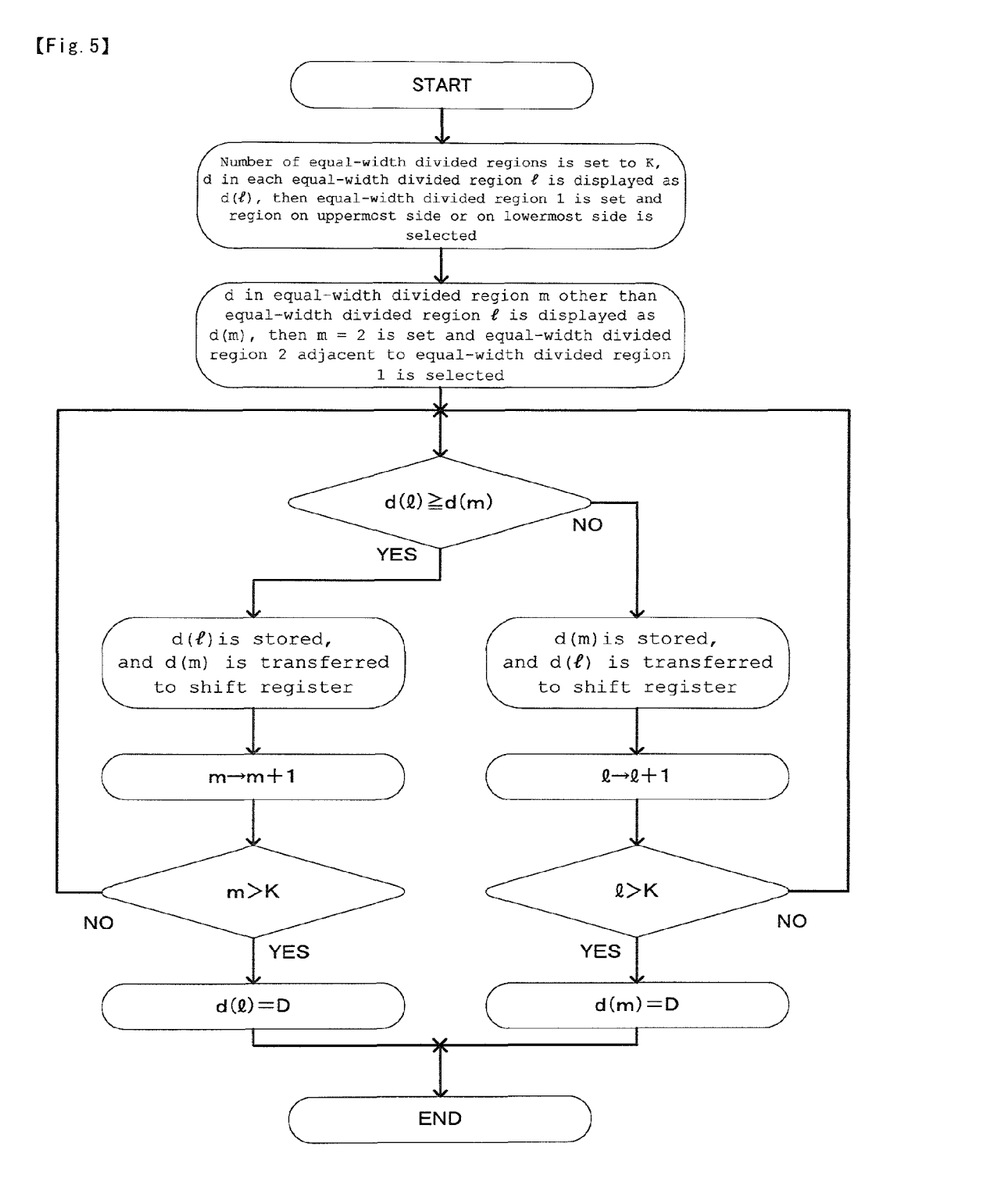
FIG. 5 shows a flow chart for detecting the maximum value D of d in the process of the 2 in each of the basic configurations (1), (2) and (3)

Specifically, in the process 2, the minimum number of multilayers $N_1$ with the assumption that d is 0 is set, the maximum number D of d is detected in the flow chart shown in FIG. 5 and the maximum number of multilayers $N_2$ in the equal-width divided region 2 where the maximum value D is formed is set;

in the process 3, as d increases between the minimum value $N_1$ and the maximum value $N_2$, an increasing number n is set, and then the number of multilayers N is selected by a general formula of N=[n]; and in the process 4, in the actual shaping, the formation and sintering of the powder layer based on the number of multilayers N selected in the process 3 are performed in the each of the equal-width divided regions 2.

Although in the process 2, with the assumption that d is 0, the minimum number of multilayers $N_1$ is set, this is because in some shaped objects 1, a region is present in which at a predetermined height and a predetermined width, the shape of the cross section 3 is not varied according to the height direction.

By contrast, in d of each of the equal-width divided regions 2, the maximum value D is always present, and in this case, since the largest variation in the shape of the cross section 3 within the equal-width divided region 2 is produced, the maximum number of multilayers $N_2$ is set.

Although in the process 3, the number of multilayers N reflecting the size relationship between the minimum value $N_1$ and the maximum value $N_2$ is selected, this selection is not particularly limited, and the order of the variations of the shape of the cross section 3 needs to reflect the order of the number of multilayers.

After the selection of the number of multilayers N which is a positive integer as described above, in the basic configurations (1), (2) and (3), as in the process 4, each of the equal-width divided regions 2 according to the process 1 is further equally divided along the up/down direction into N regions, and then in the process 1 of the equally divided N cross sections 3, the coordinates of the outer periphery 6 corresponding to a model which is to be shaped are set.

The setting of the coordinates of the outer periphery 6 can be realized by recording the shape of the model described above in the memory of the CAM and then the respective coordinates of the outer periphery regions 6 corresponding to the model described above in the cross section 3 by the further equal-width division of each of the equal-width divided regions 2 into the N regions can be calculated with the CAM.

As a result of the process 4 described above, as in the process 5, it is possible to control the performance of the forming and sintering of the powder layer based on the number of multilayers N, and the movement of the cutting tool such that the coordinates position of the outer periphery 6 set in the process 4 is the final cutting position.

It is also possible either to previously prepare the processes 1, 2 and 3 and thereafter perform the actual shaping or to perform the actual shaping from the stage of the process 1, and in particular, the basic configurations (2) and (3) can be extremely suitable for such a method as described above.

Figure 6:
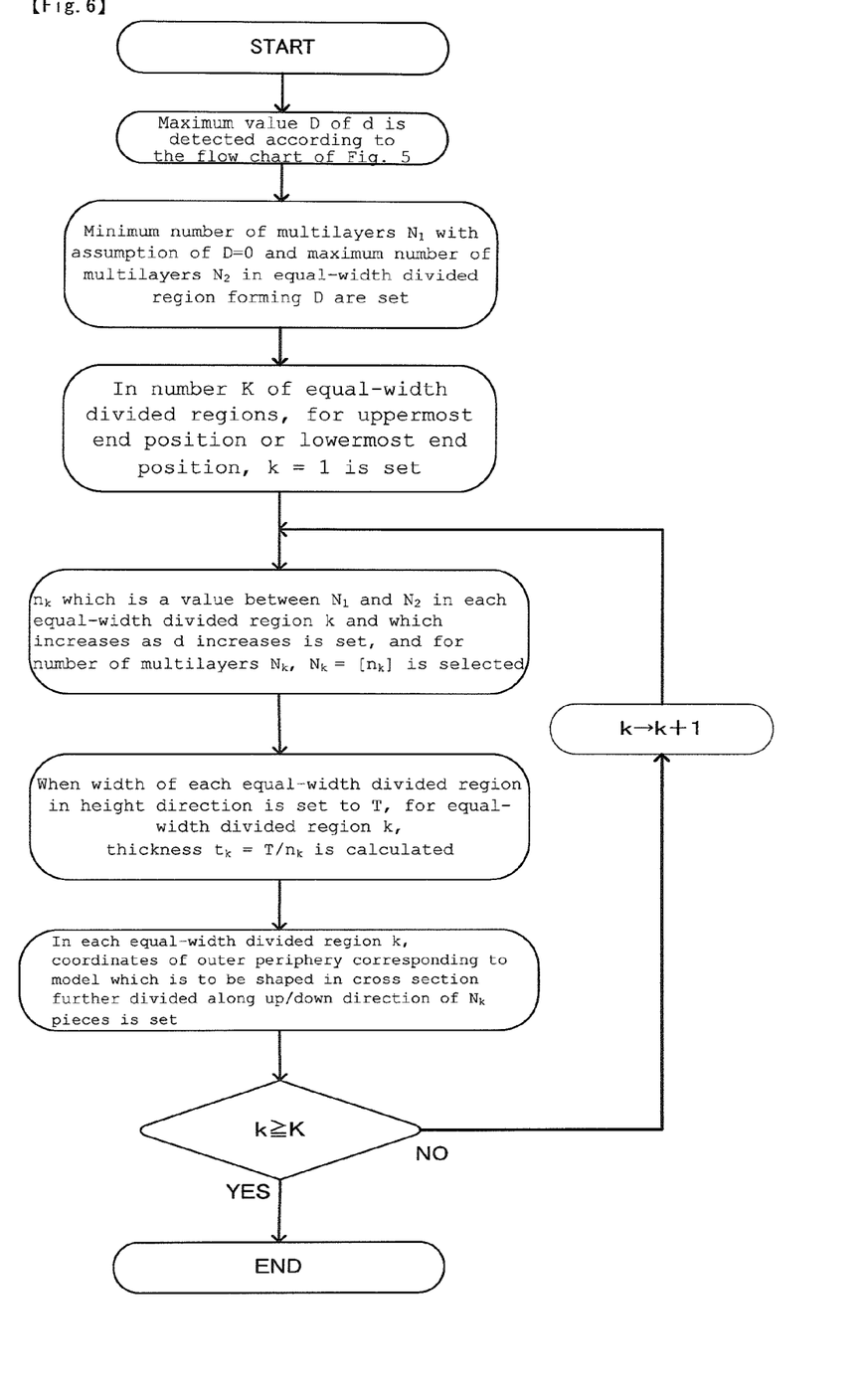
FIG. 6 shows a flow chart of the processes of the 2 and the subsequent numbers among the processes of the 1 to 4 in each of the basic configurations (1), (2) and (3)

The conditions of the processes 2, 3, 4 and 5 are individually as shown in the flow chart of FIG. 6.

As the selection of the positive integer N in the process 3, the most typical method is to adopt, as the number of multilayers N, the arithmetic mean between the minimum value $N_1$ and the maximum value $N_2$ indicated below.

$$N = \left[\left(1 - \frac{d}{D}\right)N_1 + \left(\frac{d}{D}\right)N_2\right] \quad \text{[Formula 1]}$$

As the selection of the number of multilayers N described above, in addition to the arithmetic mean, the geometric mean between the minimum value $N_1$ and the maximum value $N_2$ indicated below can also be adopted.

$$N = \left[N_1^{\left(1-\frac{d}{D}\right)} \cdot N_2^{\left(\frac{d}{D}\right)}\right] \quad \text{[Formula 2]}$$

Even in the case of the geometric mean described above, as in the case of the arithmetic mean, the variation in the shape of the cross section 3 in each of the equal-width divided regions 2 can be accurately reflected.

As the selection of the number of multilayers N, a medium value of the arithmetic mean and the geometric mean can also be adopted.

Specifically, preferably, a and b are positive numbers, and moreover a+b=1 is selected, and then the calculation of N=a·(N produced by arithmetic mean)+b·(N produced by geometric mean) or the calculation of N=(N produced by arithmetic mean)$^a$·(N produced by geometric mean)$^b$ may be performed.

Figure 7:
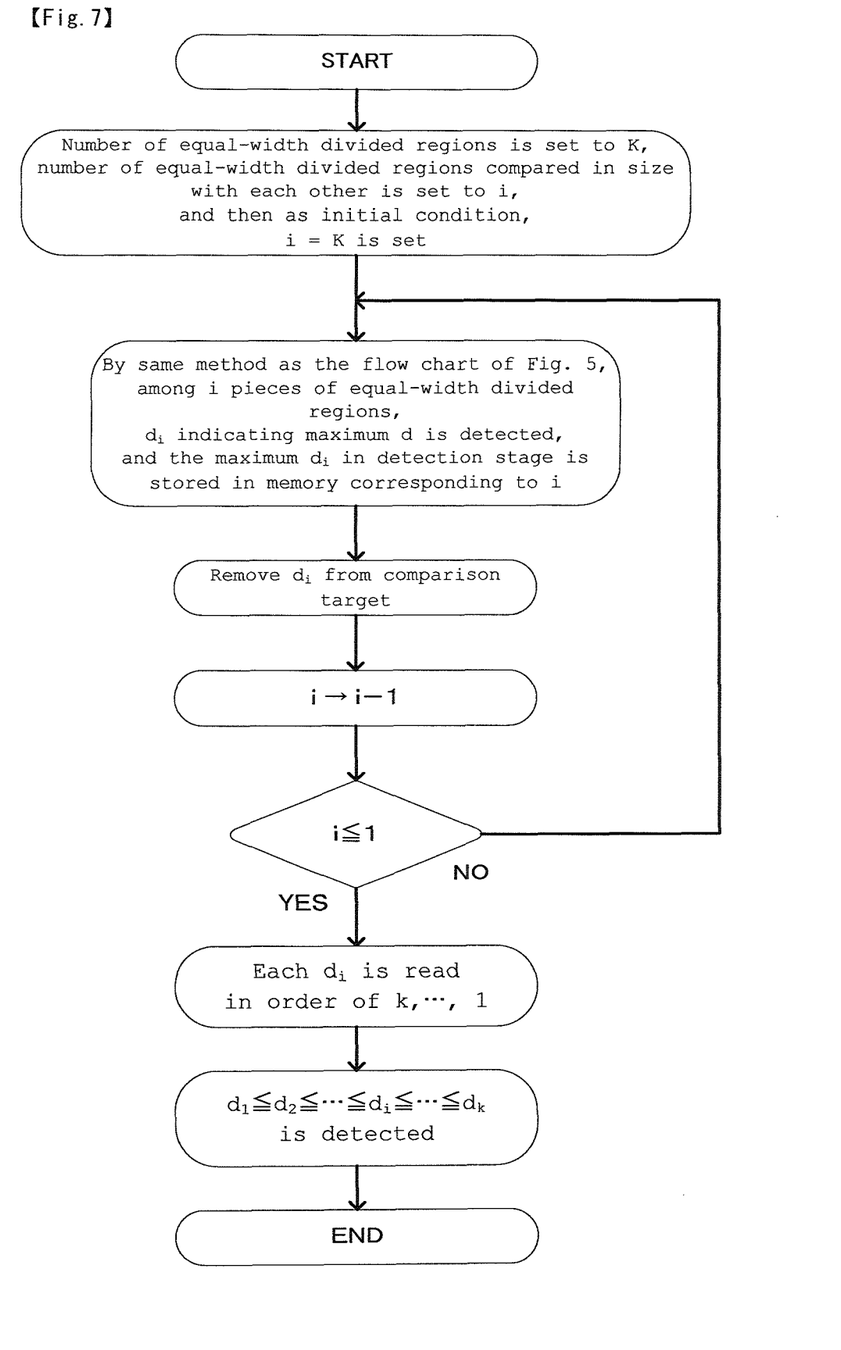
FIG. 7 shows a flow chart for detecting the order of the size of d in K pieces of equal-width divided regions.

Besides the arithmetic mean or the geometric mean described above and a combination thereof, for d in each of the K pieces of equal-width divided regions 2, the order of $d_1 \leq d_2 \leq \ldots \leq d_i \leq \ldots \leq d_K$ is detected in the flow chart of FIG. 7, and then, a state reflecting the order of size of d indicated below can also be adopted.

$$N_i = \left[N_1 + \frac{i}{K}(N_2 - N_1)\right] \quad \text{[Formula 3]}$$

A description will be given below according to Examples.

Example 1

Example 1 is characterized in that the amount of laser beam or electron beam applied per unit area is adjusted according to the thickness of each of the multilayers.

In the shaped object 1, the degree of sintering is adjusted according to the function of each region as a matter of course.

Hence, when the number of multilayers N in each of the equal-width divided regions 2 is varied, and consequently, the thickness of each multilayer unit is varied, in the case where the degree of the application of each beam is the same, as the thickness of the multilayer unit in the multilayer unit is decreased, the degree of sintering is increased, with the result that disadvantageously, the requirement for the function described above is inevitably not satisfied.

In Example 1, in order to avoid such a disadvantage, the degree of sintering is adjusted according to the variation in the thickness, it is made possible to satisfy the requirement for the function in each region.

Example 2

Example 2 is characterized in that when the cross sections 3 of the respective multilayer units are located in the same position in a direction perpendicular to the height direction, as the thickness of each multilayer unit is increased, the amount of radiation applied per unit area is set larger.

In the case of the actual three-dimensional shaped object 1, some regions where the degree of sintering is the same are present.

In such a case, when in the basic configurations (1), (2) and (3), the number of multilayers N in each of the equal-width divided regions 2 and furthermore the thickness of each multilayer unit are varied, the same degree of sintering is adopted, with the result that on the contrary, it is inevitably impossible to obtain a uniform degree of sintering.

In Example 2, consideration is given to such a condition, and as the thickness of each multilayer unit is increased, the amount of radiation applied per unit area is increased, with the result that it is made possible to realize a uniform degree of sintering.

INDUSTRIAL APPLICABILITY

As is clear from the above description, in the present invention, it is made possible to set the appropriate thickness of each multilayer unit according to the variation in the cross-sectional shape of the shaped object in the up/down direction, and the present invention can be utilized for all three-dimensional shaping.

REFERENCE SIGNS LIST

1: Object which is to be shaped
2: Equal-width divided region
3: Cross section in boundary of equal-width divided regions
4: Each multilayer region
5: Center position
6: Outer periphery

The invention claimed is:

1. A three-dimensional shaping method in which a step of forming a powder layer and a step of sintering the powder layer by application of a moving laser beam and a moving electron beam are alternately repeated to perform a multilayer operation within a container, comprising the steps of:
   providing a station including an arrangement for depositing powder and at least one of a laser beam and electron beam for sintering the deposited powder,
   setting a plurality of equal-width divided regions in a multilayer region formed by each powder layer along a height direction by a computer program of one of a CAM and a computer controller,
   then selecting a number of multilayers N in each of the equal-width divided regions by the computer program according to a variation in a cross-sectional shape of each of equal-width divided regions, and
   selecting a thickness of each multilayer unit in each of the equal-width divided regions by the computer program by the following steps:
   1. calculating with Cartesian (x,y) coordinates, in respective cross sections forming boundaries of both upper and lower sides in the equal-width divided regions of a model which is to be shaped, from each coordinate position $(x_1, y_1) \ldots (x_i, y_i) \ldots (x_h, y_h)$ forming an outer periphery of each cross section and recorded in one of the CAM and the computer controller, a center position $(x_0, y_0)$ of each of the cross sections according to:

$$x_0 = (x_1 + \ldots x_i + \ldots y_h)/h \text{ and} \qquad \text{Formula 1:}$$

$$y_0 = (y_1 + \ldots y_i + \ldots y_h)/h, \qquad \text{Formula 2:}$$

calculating and recording with one of a CAM and a computer controller, an average distance r from the center position $(x_0, y_0)$ to each coordinate position $(x_1, y_1) \ldots (x_i, y_i) \ldots (x_h, y_h)$ in the outer periphery according to the following Formulas:

$$r_i = \sqrt{(x_i - x_0)^2 + (y_i - y_0)^2} \text{ and} \qquad \text{Formula 3:}$$

$$r = (r_1 + \ldots + r_i + \ldots + r_h)/h \text{ and} \qquad \text{Formula 4:}$$

calculating, for each of the equal-width divided regions, an absolute value d of a difference between an average distance of the respective cross sections in a boundary on the upper side and an average distance of the respective cross sections in a boundary on the lower side;
   2. when it is assumed that d is 0, setting a minimum number of multilayers $N_1$, detecting the maximum value D of d and setting a maximum number of multilayers $N_2$ in the equal-width divided region where the maximum value D is formed;
   3. setting an increasing number n as d increases between the minimum value $N_1$ and the maximum value $N_2$, and selecting a number of multilayers N when N=[n], where [n] is a Gauss symbol indicating a unit of an integer and an increasing number n is set between $N_1$ and $N_2$ according to the absolute value d increasing;
   4. setting, when in each of the equal-width divided regions in the above step 1, an equal-width division is further performed with the number of multilayers N in the above step 3 along an up/down direction, coordinates of the outer periphery corresponding to the model in the above step 1 in each of cross sections of the number N; and
   5. controlling a movement of a cutting tool, in actual shaping, forming and sintering of the powder layer based on the number of multilayers N selected in the above step 3 in each of the equal-width divided regions and movement of a cutting tool in which a position of the coordinates of the outer periphery set in the above step 4 is a final cutting position.

2. The three-dimensional shaping method according to claim 1,
   wherein as the number of multilayers is N, further comprising the step of adopting an arithmetic mean between the minimum value $N_1$ and the maximum value $N_2$ according to the following Formula 5:

$$N = \left[\left(1 - \frac{d}{D}\right)N_1 + \left(\frac{d}{D}\right)N_2\right].$$

3. The three-dimensional shaping method according to claim 1,
wherein as the number of multilayers is N, further comprising the step of adopting a geometric mean between the minimum value $N_1$ and the maximum value $N_2$ according to the following Formula 6:

$$N = \left[N_1^{\left(1-\frac{d}{D}\right)} \cdot N_2^{\left(\frac{d}{D}\right)}\right].$$

4. The three-dimensional shaping method according to claim 1,
wherein as the number of multilayers is N, further comprising the step of adopting a medium value of an arithmetic mean between the minimum value $N_1$ and the maximum value $N_2$ and a geometric mean between the minimum value $N_1$ and the maximum value $N_2$.

5. The three-dimensional shaping method according to claim 1,
wherein for d in each of K pieces of equal-width divided regions, detecting an order of $d_1 \leq d_2 \leq \ldots \leq d_i \leq \ldots \leq d_K$, and
then, adopting a state reflecting an order of size of d according to the following Formula 7:

$$N_i = \left[N_1 + \frac{i}{K}(N_2 - N_1)\right].$$

6. A three-dimensional shaping method in which a step of forming a powder layer and a step of sintering the powder layer by application of one of a moving laser beam and a moving electron beam are alternately repeated to perform a multilayer operation within a container, comprising the steps of:
providing a station including an arrangement for depositing powder and at least one of a laser beam and electron beam for sintering the deposited powder,
setting a plurality of equal-width divided regions in a multilayer region formed by each powder layer along a height direction by a computer program of one of a CAM and a computer controller,
then selecting a number of multilayers N in each of the equal-width divided regions by the computer program according to a variation in a sum of maximum widths in a lateral direction and a vertical direction in Cartesian coordinates, and
selecting a thickness of each multilayer unit in each of the equal-width divided regions by the computer program by the following steps:
1. adopting Cartesian (x, y) coordinates and then calculating, in respective cross sections forming boundaries of both upper and lower sides in the equal-width divided regions of a model which is to be shaped, a sum of maximum widths of the respective cross sections in a lateral direction and maximum widths thereof in a vertical direction with one of the CAM and the computer controller and
calculating, for each of the equal-width divided regions, an absolute value d of a difference between a sum of the respective cross sections in the boundary on the upper side and a sum of the respective cross sections in the boundary on the lower side;
2. when it is assumed that d is 0, setting a minimum number of multilayers $N_1$, detecting the maximum value D of d and setting a maximum number of multilayers $N_2$ in the equal-width divided region where the maximum value D is formed;
3. setting an increasing number n as d increases between the minimum value $N_1$ and the maximum value $N_2$, and selecting a number of multilayers N when N=[n], where [n] is a Gauss symbol indicating a unit of an integer and an increasing number n is set between $N_1$ and $N_2$ according to the absolute value d increasing;
4. setting, when in each of the equal-width divided regions in the above step 1, an equal-width division is further performed with the number of multilayers N in the above step 3 along an up/down direction, coordinates of the outer periphery corresponding to the model in the above step 1 in each of cross sections of the number N; and
5. controlling a movement of a cutting tool, in actual shaping, forming and sintering of the powder layer based on the number of multilayers N selected in the above step 3 in each of the equal-width divided regions and movement of a cutting tool in which a position of the coordinates of the outer periphery set in the above step 4 is a final cutting position.

7. The three-dimensional shaping method according to claim 6,
wherein as the number of multilayers is N, further comprising the step of adopting an arithmetic mean between the minimum value $N_1$ and the maximum value $N_2$ according to the following Formula 8:

$$N = \left[\left(1 - \frac{d}{D}\right)N_1 + \left(\frac{d}{D}\right)N_2\right].$$

8. The three-dimensional shaping method according to claim 6,
wherein as the number of multilayers is N, further comprising the step of adopting a geometric mean between the minimum value $N_1$ and the maximum value $N_2$ according to the following Formula 9:

$$N = \left[N_1^{\left(1-\frac{d}{D}\right)} \cdot N_2^{\left(\frac{d}{D}\right)}\right].$$

9. The three-dimensional shaping method according to claim 6,
wherein as the number of multilayers is N, further comprising the step of adopting a medium value of an arithmetic mean between the minimum value $N_1$ and the maximum value $N_2$ and a geometric mean between the minimum value $N_1$ and the maximum value $N_2$.

10. The three-dimensional shaping method according to claim 6,
wherein for d in each of K pieces of equal-width divided regions, detecting an order of $d_1 \leq d_2 \leq \ldots \leq d_i \leq \ldots \leq d_K$, and then, adopting a state reflecting an order of size of d according to the following Formula 10:

$$N_i = \left[ N_1 + \frac{i}{K}(N_2 - N_1) \right].$$

11. A three-dimensional shaping method in which a step of forming a powder layer and a step of sintering the powder layer by application one of a moving laser beam and a moving electron beam are alternately repeated to perform a multilayer operation within a container, comprising the steps of:
    providing a station including an arrangement for depositing powder and at least one of a laser beam and electron beam for sintering the deposited powder,
    setting a plurality of equal-width divided regions in a multilayer region formed by each powder layer along a height direction by a computer program of one of a CAM and a computer controller,
    then selecting a number of multilayers N in each of the equal-width divided regions by the computer program according to a variation in a maximum distance from a center position in rotational coordinates, and
    selecting a thickness of each multilayer unit in each of the equal-width divided regions by the computer program by the following steps:
    1. adopting rotational (r, θ) coordinates, and then calculating, in respective cross sections forming boundaries of both upper and lower sides in the equal-width divided regions of a model which is to be shaped, from each coordinate position $(r_1, \theta_1) \ldots (r_i, \theta_i) \ldots (r_h, \theta_h)$ forming an outer periphery and recorded in one of the CAM and the computer controller, a center position $(r_0, \theta_0)$ of each of the cross sections according to:

$r_0 = (r_1 + \ldots + r_i + \ldots + r_h)/h$ and  Formula 11:

$\theta_0 = (\theta_1 + \ldots + \theta_i + \ldots + \theta_h)/h$  Formula 12:

regarding each distance from the center position $(r_0, \theta_0)$ to each coordinate position $(r_1, \theta_1) \ldots (r_i, \theta_i) \ldots (r_h, \theta_h)$ forming the outer periphery,
    shifting the already set center position (0, 0) in (r, θ) coordinates to said position $(r_0, \theta_0)$,
    calculating $r_1' \ldots r_i' \ldots r_h'$ from a new center position (0, 0) grounding on the shift to each coordinate position of the outer periphery, and selecting a maximum distance from each calculated distance, and
    calculating, for each of the equal-width divided regions, an absolute value d of a difference between a maximum distance of the respective cross sections in a boundary on the upper side and a maximum distance of the respective cross sections in a boundary on the lower side;
    2. when it is assumed that d is 0, setting a minimum number of multilayers $N_1$, detecting the maximum value D of d and setting a maximum number of multilayers $N_2$ in the equal-width divided region where the maximum value D is formed;
    3. setting an increasing number n as d increases between the minimum value $N_1$ and the maximum value $N_2$, and selecting a number of multilayers N when N=[n], where [n] is a Gauss symbol indicating a unit of an integer and an increasing number n is set between $N_1$ and $N_2$ according to the absolute value d increasing;
    4. setting, when in each of the equal-width divided regions in the above step 1, an equal-width division is further performed with the number of multilayers N in the above step 3 along an up/down direction, coordinates of the outer periphery corresponding to the model in the above step 1 in each of cross sections of the number N; and
    5. controlling a movement of a cutting tool, in actual shaping, forming and sintering of the powder layer based on the number of multilayers N selected in the above step 3 in each of the equal-width divided regions and movement of a cutting tool in which a position of the coordinates of the outer periphery set in the above step 4 is a final cutting position.

12. The three-dimensional shaping method according to claim 11,
    wherein as the number of multilayers is N, an arithmetic mean between the minimum value $N_1$ and the maximum value $N_2$ according to the following Formula 13:

$$N = \left[ \left(1 - \frac{d}{D}\right) N_1 + \left(\frac{d}{D}\right) N_2 \right].$$

13. The three-dimensional shaping method according to claim 11,
    wherein as the number of multilayers is N, further comprising the step of adopting a geometric mean between the minimum value $N_1$ and the maximum value $N_2$ according to the following Formula 14:

$$N = \left[ N_1^{\left(1-\frac{d}{D}\right)} \cdot N_2^{\left(\frac{d}{D}\right)} \right].$$

14. The three-dimensional shaping method according to claim 11,
    wherein as the number of multilayers is N, further comprising the step of adopting a medium value of an arithmetic mean between the minimum value $N_1$ and the maximum value $N_2$ and a geometric mean between the minimum value $N_1$ and the maximum value $N_2$.

15. The three-dimensional shaping method according to claim 11,
    wherein for d in each of K pieces of equal-width divided regions, detecting an order of $d_1 \leq d_2 \leq \ldots \leq d_i \leq \ldots \leq d_K$, and
    then, adopting a state reflecting an order of size of d according to the following Formula 15:

$$N_i = \left[ N_1 + \frac{i}{K}(N_2 - N_1) \right].$$

16. The three-dimensional shaping method according to claim 1
    further comprising the step of adjusting an amount of the laser beam or the electron beam applied per unit area according to the thickness of each of the multilayers.

17. The three-dimensional shaping method according to claim 16, wherein when the cross sections of the respective multilayer units are located in a same position in a direction perpendicular to a height direction, as the thickness of each of the multilayer units is increased, further comprising the step of setting the amount of radiation applied per unit area larger.

18. The three-dimensional shaping method according to claim 6
further comprising the step of adjusting an amount of the laser beam or the electron beam applied per unit area according to the thickness of each of the multilayers.

19. The three-dimensional shaping method according to claim 18,
wherein when the cross sections of the respective multilayer units are located in a same position in a direction perpendicular to a height direction, as the thickness of each of the multilayer units is increased, further comprising the step of setting the amount of radiation applied per unit area larger.

20. The three-dimensional shaping method according to claim 11
further comprising the step of adjusting an amount of the laser beam or the electron beam applied per unit area according to the thickness of each of the multilayers.

21. The three-dimensional shaping method according to claim 20,
wherein when the cross sections of the respective multilayer units are located in a same position in a direction perpendicular to a height direction, as the thickness of each of the multilayer units is increased, further comprising the step of setting the amount of radiation applied per unit area larger.

\* \* \* \* \*